United States Patent
Lee et al.

(10) Patent No.: US 8,906,560 B2
(45) Date of Patent: *Dec. 9, 2014

(54) ORGANIC/INORGANIC COMPLEX PROTON CONDUCTOR, ELECTRODE FOR FUEL CELL INCLUDING ORGANIC/INORGANIC COMPLEX PROTON CONDUCTOR, ELECTROLYTE MEMBRANE FOR FUEL CELL INCLUDING ORGANIC/INORGANIC COMPLEX PROTON CONDUCTOR, AND FUEL CELL INCLUDING ORGANIC/INORGANIC COMPLEX PROTON CONDUCTOR

(75) Inventors: Myung-Jin Lee, Seoul (KR); Tae-young Kim, Seoul (KR); Pil-won Heo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 872 days.

This patent is subject to a terminal disclaimer.

(21) Appl. No.: 12/902,487

(22) Filed: Oct. 12, 2010

(65) Prior Publication Data

US 2011/0143258 A1 Jun. 16, 2011

(30) Foreign Application Priority Data

Dec. 11, 2009 (KR) ........................ 10-2009-0123397

(51) Int. Cl.
| | | |
|---|---|---|
| *H01M 8/00* | (2006.01) | |
| *H01M 8/10* | (2006.01) | |
| *H01M 4/36* | (2006.01) | |
| *H01M 4/48* | (2010.01) | |
| *H01B 1/12* | (2006.01) | |
| *H01M 4/86* | (2006.01) | |

(52) U.S. Cl.
CPC ............. *H01B 1/122* (2013.01); *H01M 4/8663* (2013.01); *H01M 8/1018* (2013.01); *H01M 2008/1095* (2013.01); *Y02E 60/521* (2013.01)
USPC ........... 429/400; 429/479; 429/484; 429/488; 429/491; 429/492; 429/493; 429/495

(58) Field of Classification Search
CPC .................. H01M 8/1018; H01M 2008/1095; H01M 4/8663
USPC ......... 429/400, 479, 484, 429, 488, 491, 492, 429/493, 495
See application file for complete search history.

(56) References Cited

U.S. PATENT DOCUMENTS 5,552,239 A * 9/1996 Gozdz et al. ..................... 429/94
2006/0280984 A1 * 12/2006 Lee et al. ........................ 429/33

(Continued)

FOREIGN PATENT DOCUMENTS

| JP | 2005-317238 | 11/2005 |
| JP | 2008-084788 | 4/2008 |

(Continued)

OTHER PUBLICATIONS

Attidekou et al. (Journal of the Electrochemical Society vol. 154 No. 3 pp. A217-A220 2007).*

(Continued)

*Primary Examiner* — Patrick Ryan
*Assistant Examiner* — Aaron Greso
(74) *Attorney, Agent, or Firm* — Cantor Colburn LLP

(57) ABSTRACT

Organic/inorganic complex proton conductors are provided which display high proton conductivity over a wide temperature range. Electrodes for fuel cells which include the organic/inorganic complex proton conductors are also provided. The invention also advantageously provides electrolyte membranes for fuel cells including the organic/inorganic complex proton conductors, and fuel cells including the organic/inorganic complex proton conductors.

31 Claims, 6 Drawing Sheets

(56) References Cited

U.S. PATENT DOCUMENTS

| | | |
|---|---|---|
| 2009/0092880 A1* | 4/2009 | Kim et al. .................... 429/33 |
| 2009/0169956 A1 | 7/2009 | Lee et al. |
| 2010/0167103 A1 | 7/2010 | Lee et al. |
| 2011/0086290 A1 | 4/2011 | Kim et al. |

FOREIGN PATENT DOCUMENTS

| | | |
|---|---|---|
| JP | 2008-218408 | 9/2008 |
| KR | 10-0708489 | 4/2007 |

OTHER PUBLICATIONS

Quan-Tong et al Chinese J of Applied Chemistry vol. 26 No. 9 pp. 1015-1018 (CHE) with Eng Translation.*

Daoust et al Polymer International vol. 50 pp. 917-924 2001.*

K. D. Kreuer et al., "Imidazole and pyrazole-based proton conducting polymers and liquids," Electrochimica Acta, vol. 43, Nos. 10-11, 1998, pp. 1281-1288.

B.V.R. Chowdari et al., "New Proton Conducting Polymers for Fuel Cell Applications," Solid State Ionics: Science & Technology, pp. 268-274.

Pilwon Heo et al., "$Sn_{0.9}In_{0.1}P_2O_7$-Based Organic/Inorganic Composite Membranes Application to Intermediate-Temperature Fuel Cells," Journal of the Electrochemical Society, vol. 154, No. 1, 2007, B63-B67.

Pilwon Heo et al., "Proton Conduction in $Sn_{0.95}Al_{0.05}P_2O_7$-PBI-PTFE Composite Membrane," Electrochemical and Solid-State Letters, vol. 11, No. 6, 2008, pp. B91-B95.

* cited by examiner

11

12

10

ORGANIC/INORGANIC COMPLEX PROTON CONDUCTOR, ELECTRODE FOR FUEL CELL INCLUDING ORGANIC/INORGANIC COMPLEX PROTON CONDUCTOR, ELECTROLYTE MEMBRANE FOR FUEL CELL INCLUDING ORGANIC/INORGANIC COMPLEX PROTON CONDUCTOR, AND FUEL CELL INCLUDING ORGANIC/INORGANIC COMPLEX PROTON CONDUCTOR

CROSS-REFERENCE TO RELATED APPLICATIONS

This application claims the benefit of Korean Patent Application No. 10-2009-0123397, filed on Dec. 11, 2009, in the Korean Intellectual Property Office, the disclosure of which is incorporated herein in its entirety by reference.

BACKGROUND

1. Field

The present disclosure relates to organic/inorganic complex proton conductors, fuel cell electrodes including the organic/inorganic complex proton conductors, electrolyte membranes for fuel cells including the organic/inorganic complex proton conductors, and fuel cells including the organic/inorganic complex proton conductors.

2. Description of the Related Art

In polymer electrolyte membrane fuel cells (PEMFCs), it is very important to develop proton conductors that conduct protons under non- or low-humidified and high temperature conditions.

In order to obtain polymer electrolyte membranes that operate properly at high temperatures, alternatives to water used in a conventional electrolyte membrane need to be used.

Examples of alternatives include a heterocyclic compound such as imidazole, pyrazole, or benzimidazole.

However, due to the volatility of the heterocyclic compound, the heterocyclic compound needs to be directly fixed to a polymer electrolyte membrane for use in fuel cells at high temperatures in order to maintain the fluidity and flow of protons.

SUMMARY

Provided are organic/inorganic complex proton conductors having high proton conductivity over a wide temperature range, electrodes for fuel cells including the organic/inorganic complex proton conductors, electrolyte membranes for fuel cells including the organic/inorganic complex proton conductors, and fuel cells including the organic/inorganic complex proton conductors.

Additional aspects will be set forth in part in the description which follows and, in part, will be apparent from the description, or from the presented embodiments.

According to one aspect of the present invention, an organic/inorganic complex proton conductor includes an inorganic ion conductor represented by Formula 1 below and a hydrocarbon polymer:

$$M_{1-a}N_aP_2O_7 \quad \text{Formula 1}$$

where

M is a metallic element having an oxidation number of +4,
N is an alkali metal or alkali earth metal, and
a is a real number in the range of 0.01 to 0.7.

According to another aspect of the present invention, an electrolyte membrane for a fuel cell includes the organic/inorganic complex proton conductor.

According to another aspect of the present invention, an electrode for a fuel cell includes the organic/inorganic complex proton conductor.

According to another aspect of the present invention, a fuel cell includes a positive electrode, a negative electrode, and an electrolyte membrane interposed between the positive electrode and the negative electrode.

Additional aspects and/or advantages of the invention will be set forth in part in the description which follows and, in part, may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
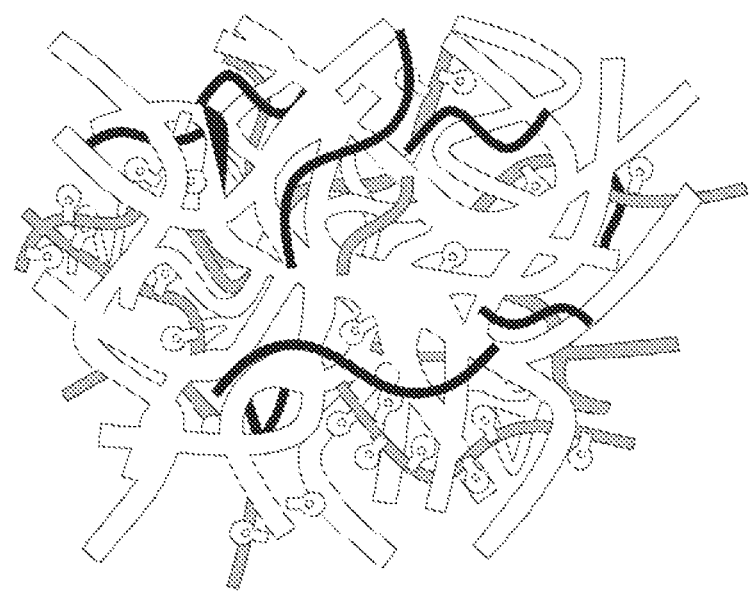
FIG. 1 is a schematic view of an organic/inorganic complex proton conductor according to an embodiment of the present invention.
Figure 1:
Figure 1:
Figure 1:

Reference will now be made in detail to the representative embodiments of the present invention, examples of which are illustrated in the accompanying drawings, wherein like reference numerals refer to like elements throughout. The embodiments which are described below are provided as representative embodiments, but should not be construed as limiting the scope of the present invention.

An organic/inorganic complex proton conductor according to an embodiment of the present invention includes an inorganic ion conductor represented by Formula 1 and a hydrocarbon polymer.

$$M_{1-a}N_aP_2O_7 \quad \text{Formula 1}$$

where

M is a metallic element having an oxidation number of +4,
N is alkali metal or alkali earth metal, and
a is a real number in the range of 0.01 to 0.7.

M is a metallic element that forms a cation having an oxidation number of +4, and may be selected from the group consisting of tin (Sn), zirconium (Zr), tungsten (W), silicon (Si), molybdenum (Mo), titanium (Ti), and a mixture thereof.

N may be selected from the group consisting of lithium (Li), sodium (Na), potassium (K), cesium (Cs), beryllium (Be), magnesium (Mg), calcium (Ca), strontium (Sr) and barium (Ba), and a mixture thereof. For example, N may be lithium (Li), sodium (Na), potassium (K), or cesium (Cs).

The inorganic ion conductor of Formula 1 may have a structure in which some M that forms a cation having an oxidation number of +4 is substituted with N that is an alkali metal or alkali earth metal.

M may be Sn and N may be Li, and an example of the inorganic ion conductor in this case may be $Sn_{1-a}Li_aP_2O_7$ where a is a real number in the range of 0.01 to 0.7.

$Sn_{1-a}Li_aP_2O_7$ is formed by substituting some Sn4+ of $SnP_2O_7$ (Tin Phosphate) with a metallic ion having an oxidation number of +1 (Li+, Na+, K+, or Cs+). As described above, when an alkali metallic ion, which is a metallic ion having an oxidation number of +1, is doped, point defects occur and thus the concentration of protons in the lattice structure is increased. In addition, since the doping material is an alkali metal, bonding with the phosphoric acid is strengthened and thus conducting characteristics may be sustained at high temperature.

When a in $Sn_{1-a}Li_aP_2O_7$ is in the range of 0.1 to 0.3, $Sn_{1-a}Li_aP_2O_7$ has a main phase crystal structure, which is identified by X-ray diffraction analysis. When a in $Sn_{1-a}Li_aP_2O_7$ is in the range of 0.4 to 0.5, a new phase of lithium, beyond the extent of solid solution, that is, a secondary phase of lithium may be observed.

Examples of the inorganic ion conductor of Formula 1 include $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, and $W_{0.9}Li_{0.1}P_2O_7$.

The hydrocarbon polymer may be mixed with the inorganic ion conductor 1, which mainly conducts protons, and may act as a proton pathway for providing a proton pathway medium.

The hydrocarbon polymer may include at least one selected from the group consisting of a sulfonated polymer, an acidic group-containing hydrophilic polymer, a fluorinated polymer, and a basic polymer.

For example, the hydrocarbon polymer may be a mixture including a sulfonated polymer and an acidic group-containing hydrophilic polymer.

The acidic group-containing hydrophilic polymer may be a phosphoric acid-containing polymer.

The phosphoric acid-containing polymer provides a pathway for protons of a sulfonic acid group of the sulfonated polymer and secures proton conductivity.

The phosphoric acid-containing polymer may be a polymerization product of a phosphoric acid-containing monomer, that is, a phosmer. For example, the phosphoric acid-containing polymer may be formed by polymerizing the phosmer in the presence of a polymerization initiator.

The phosmer may be a compound represented by Formula 2 or 3 below:

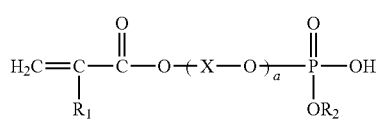

Formula 2 in formula 2, X is an unsubstituted or substituted C1-C20 alkylene group,
a is an integer in the range of 1 to 10,
$R_1$ is hydrogen or a C1-C20 alkyl group, and
$R_2$ is selected from the group consisting of hydrogen, an unsubstituted or substituted C1-C20 alkyl group, an unsubstituted or substituted C1-C20 hydroxyalkyl group, and an unsubstituted or substituted C1-C20 hydroxyalkylamino group, and

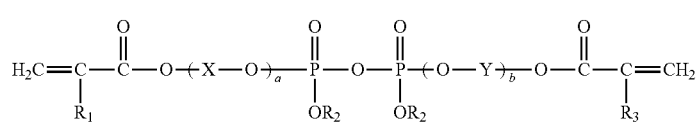

Formula 3 in formula 3, X and Y are each independently an unsubstituted or substituted C1-C20 alkylene group,
a and b are each independently in the range of 1 to 10,
$R_1$ and $R_3$ are each independently hydrogen or a C1-C20 alkyl group, and
$R_2$ is selected from the group consisting of hydrogen, an unsubstituted or substituted C1-C20 alkyl group, an unsubstituted or substituted C1-C20 hydroxyalkyl group, and an unsubstituted or substituted C1-C20 hydroxyalkylamino group.

The compound of Formula 2 may include at least one compound selected from the group consisting of compounds represented by Formulae 4 through 6 below:

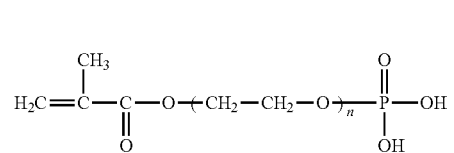

Formula 4 in formula 4, n is an integer in the range of 2 to 10, and according to an embodiment, n may be 4 or 5,

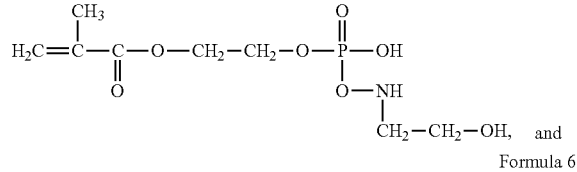

Formula 5

Formula 6 where n is an integer in the range of 2 to 10, and according to an embodiment, n may be 5 or 6.

The compound of Formula 4 may be a compound represented by Formula 4a:

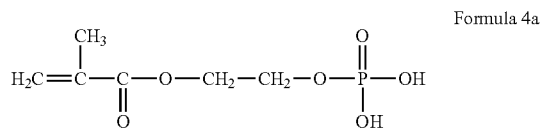

Formula 4a

The compound represented by Formula 3 may be a compound represented by Formula 7:

Formula 7

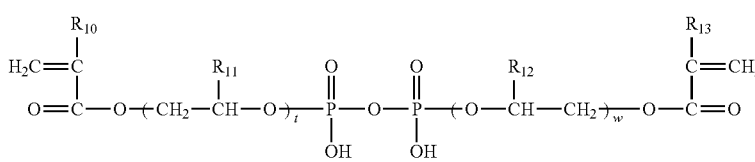

where $R_{10}$ and $R_{13}$ are each independently hydrogen or a C1-C20 alkyl group, $R_{11}$ and $R_{12}$ are each independently hydrogen or a C1-C20 alkyl group, and each of t and w is an integer in the range of 1 to 10.

The compound of Formula 7 may be a compound having the following structure:

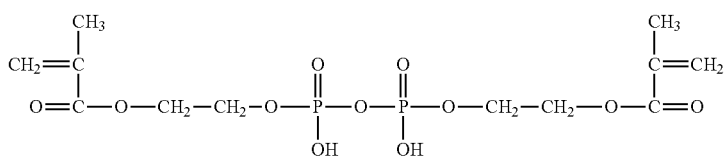

The average molecular weight of the acidic group-containing hydrophilic polymer may be in the range of about 1,000 to about 1,000,000 g/mol; in one example, about 10,000 to about 100,000 g/mol; and in another example, about 50,000 to about 80,000 g/mol.

The average molecular weight of the sulfonated polymer may be in the range of about 100,000 to about 1,000,000 g/mol; for example, about 400,000 to about 600,000 g/mol.

The mixed mole ratio of the sulfonated polymer to the monomer for forming the acidic group-containing hydrophilic polymer may be in the range of 1:1 to 1:10, for example, 1:3 to 1:5.

The monomer for forming the acidic group-containing hydrophilic polymer may be a phosmer for forming a phosphoric acid-containing polymer.

The mixed mole ratio is obtained using a mole of each of the sulfonated polymer and the phosphoric acid-containing monomer, the mole calculated by using the molecular weight of a repeating unit of each of the sulfonated polymer and the phosphoric acid-containing monomer.

In the organic/inorganic complex proton conductor, the amount of the inorganic ion conductor may be in the range of about 5 to about 900 parts by weight, for example, about 100 to about 900 parts by weight, based on 100 parts by weight of the hydrocarbon polymer.

The sulfonated polymer may include at least one selected from the group consisting of sulfonated polyarylenesulfone, perfluorinated sulfonic acid-containing polymer, sulfonated polyether ether ketone (SPEKK), and sulfonated polyetherimide. The sulfonated polymer may be a compound represented by Formula 8 below:

Formula 8

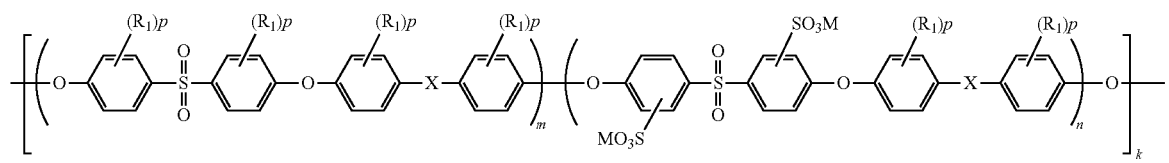

where $R_1$ is identical to or different from each other, and is a C1-C10 alkyl group, a C2-C10 alkenyl group, a phenyl group, or a nitro group, p is an integer in the range of 0 to 4, X is —C(CF$_3$)$_2$—, —C(CH$_3$)$_2$—, or —PY'(=O)— where Y' is H or C$_6$H$_5$, M is Na, K, or H, m is a real number in the range of 0.1 to 10, n is a real number in the range of 0.1 to 10, and k is a real number in the range of 5 to 500.

The sulfonated polymer may be a compound represented by Formula 9, Formula 10, or Formula 11 below:

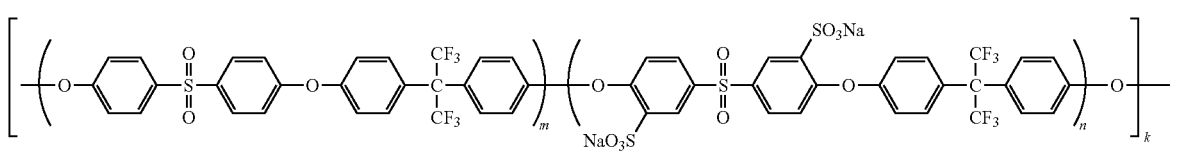

Formula 9 where m is a real number in the range of 0.1 to 4, and n is a real number in the range of 0.1 to 4, and
k is a real number in the range of 5 to 500,

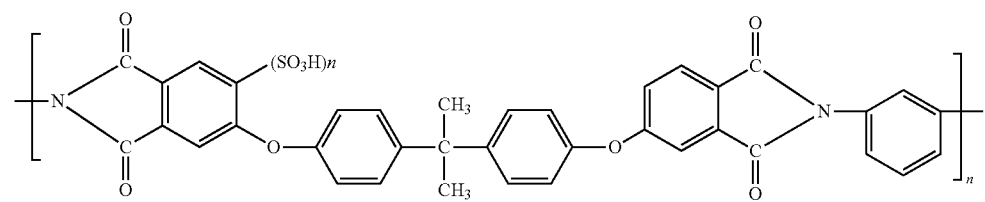

Formula 10 in formula 10, n is a real number in the range of 2 to 500, and

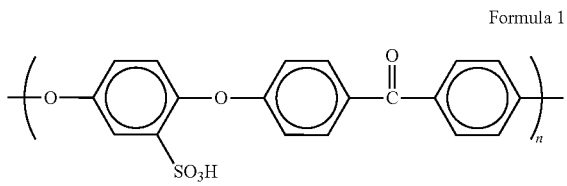

Formula 11 in formula 11, n is a real number in the range of 3 to 500.

The fluorinated polymer may be a polyvinylidenefluoride polymer, a polytetrafluoroethylene polymer, or a perfluorosulfonated hydrocarbon polymer.

The basic polymer may be polybenzimidazole, polyamideimide, or polyazole.

FIG. 1 is a schematic view of the organic/inorganic complex proton conductor described above.

With reference to FIG. 1, the organic/inorganic complex proton conductor will be described using as an example of the hydrocarbon polymer a mixture including a sulfonated poly (arylene ether sulfone) (PSF) as the sulfonated polymer and a phosphoric acid-containing hydrophilic polymer which is a polymer of a phosmer.

Referring to FIG. 1, the inorganic ion conductor of Formula 1 mainly conducts protons and acts as an inorganic material support, and a PSF 11 and a polymer of phosmer 12 form the hydrocarbon polymer, act as a proton conducting medium constituting a plasticizer, and form a network with the inorganic ion conductor. As a result, even under non- or low-humidified and high temperature conditions, proton conductivity of the organic/inorganic complex proton conductor is improved. Thus, a fuel cell including the organic/inorganic complex proton conductor may have stable resistance characteristics with respect to time.

A method of manufacturing the inorganic ion conductor of Formula 1 will be described in detail.

First, an element (M) precursor, an alkali metal or alkali earth metal (N) precursor, and a phosphoric acid are mixed and a solvent is added thereto and mixed together, thereby forming a composition of the inorganic ion conductor of Formula 1, wherein the element (M) has an oxidation number of +4.

The solvent may be deionized water, methanol, ethanol, or isopropylalcohol, and the amount of the solvent may be in the range of about 300 to about 800 parts by weight based on 100 parts by weight of the M precursor.

If the amount of the solvent is within the range described above, the viscosity of the composition may be appropriate and good processing ability may be obtained.

The composition may be stirred at a temperature of about 200 to about 300° C.

If the stirring is performed in the temperature range described above, the components of the composition may be homogenously mixed and water may be removed from the composition, thereby obtaining an appropriate level of viscosity. If the viscosity of the composition is appropriately controlled, the subsequent heat treatment may be efficiently performed without phase separation.

Then, the mixture is heat treated at a temperature of about 300 to about 1200° C. and then the heat treated product is milled into powder with a predetermined particle size, thereby obtaining the inorganic ion conductor of Formula 1.

Examples of the M precursor include M oxides, M chlorides, and M hydroxides. In detail, the M precursor may include at least one selected from the group consisting of tin oxide ($SnO_2$), tin chloride ($SnCl_4$, $SnCl_2$), tin hydroxide ($Sn(OH)_4$), tungsten oxide ($WO_2$, $WO_3$), tungsten chloride ($WCl_4$), molybdenum oxide ($MoO_2$), molybdenum chloride ($MoCl_3$), zirconium oxide ($ZrO_2$), zirconium chloride ($ZrCl_4$), zirconium hydroxide ($Zr(OH)_4$), titanium oxide ($TiO_2$), and titanium chloride ($TiCl_2$, $TiCl_3$).

Examples of the N precursor include N oxides, N chlorides, N hydroxides, and N nitrates. In detail, the N precursor may include at least one selected from the group consisting of lithium hydroxide ($LiOH.H_2O$), lithium oxide ($Li_2O$), lithium chloride (LiCl), lithium nitrate (LiNO$_3$), sodium hydroxide (NaOH), sodium chloride (NaCl), potassium hydroxide (KOH), potassium chloride (KCl), cesium hydroxide (CsOH.H$_2$O), or cesium chloride (CsCl).

The amount of the N precursor may be in the range of about 5 to about 50 mol % based on 100 mol % of the total amount of the M precursor and the N precursor.

When the amount of the N precursor is within this range, the inorganic ion conductor of Formula 1 may be obtained.

The phosphoric acid is provided using about 80 to about 100 weight % of a phosphoric acid aqueous solution. In this regard, when 85 weight % of the phosphoric acid aqueous solution is used, the amount of the phosphoric acid may be in the range of about 200 to about 300 parts by weight based on 100 parts by weight of the M precursor. When the amount of the phosphoric acid is within this range, the inorganic ion conductor of Formula 1 may be easily obtained even when loss of the phosphoric acid occurs during the heat treatment.

When the heat treatment temperature of the composition is within this range, the inorganic ion conductor of Formula 1 having high proton conductivity may be obtained without structural change.

The heat treatment time may vary according to the heat treatment temperature. According to an embodiment, the heat treatment time may be in the range of about 1 to about 5 hours.

The heat treatment may be performed under an inert gas atmosphere such as nitrogen gas atmosphere, or under the air atmosphere.

During the milling, the particle diameter is not limited and may be in the range of about 50 to about 5000 nm.

The inorganic ion conductor of Formula 1 may be $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, or $W_{0.9}Li_{0.1}P_2O_7$.

An electrolyte membrane for a fuel cell according to an embodiment of the present invention includes the organic/inorganic complex proton conductor including the inorganic ion conductor of Formula 1 and the hydrocarbon polymer.

The fuel cell electrolyte membrane may have high proton conductivity in a wide temperature range without a liquid medium such as water or a phosphoric acid, and mechanical stability.

Since the organic/inorganic complex proton conductor has high heat resistance and excellent mechanical characteristics, the organic/inorganic complex proton conductor may be used in fuel cells operating at a temperature of 150° C. or more. Meanwhile, when a liquid medium such as water or a phosphoric acid is used, due to swelling and shrinking, mechanical strength and durability of an electrolyte membrane are decreased and water generated as a result of fuel reaction leaks out. However, the decrease and leakage may be prevented by using the organic/inorganic complex proton conductor. In addition, catalyst poisoning may be prevented, and a fuel cell system may be simplified because a humidifying device is not used. Furthermore, battery resistance may be stabilized over time.

Hereinafter, a method of manufacturing a fuel cell electrolyte membrane including the organic/inorganic complex proton conductor will be described in detail, wherein the hydrocarbon polymer includes a sulfonated polymer and a phosphoric acid-containing polymer.

First, a sulfonated polymer, a phosphoric acid-containing monomer, a solvent, and a polymerization initiator are mixed by stirring. In this regard, the solvent may be methylpyrrolidone (NMP), dimethylacetamide (DMAC), or the like, and the amount of the solvent may be in the range of about 500 to about 2000 parts by weight based on 100 parts by weight of the sulfonated polymer.

The polymerization initiator may initiate a polymerization reaction of a phosmer, which is a phosphoric acid-containing monomer, and may be azobisisobutyronitrile(AIBN) or benzoin ethyl ether. The amount of the polymerization initiator may be in the range of about 1 to about 3 parts by weight based on 100 parts by weight of the phosphoric acid-containing monomer in consideration of polymerization reactivity of the phosphoric acid-containing monomer.

The resultant product is stirred at room temperature, for example, at a temperature of about 20 to about 25° C., and then the inorganic ion conductor of Formula 1 is added thereto and stirred together.

The stirring may be performed using a ball mill stirrer. The use of a ball mill stirrer may allow the respective components to be homogeneously dispersed.

Then, the resultant product was heat treated to form a polymer electrolyte membrane.

The heat treatment may be performed at a temperature of about 60 to about 130° C. When the heat treatment temperature is in this range, polymerization reactivity of the phosphoric acid-containing monomer may be excellent.

The fuel cell electrolyte membrane may have high heat resistance at high temperature, and high proton conductivity over a wide temperature range. In addition, the fuel cell electrolyte membrane may have high proton conductivity under non- or low-humidified and high temperature conditions.

An electrode for a fuel cell according to an embodiment of the present invention includes the organic/inorganic complex proton conductor.

The organic/inorganic complex proton conductor may be coated on the surface of an electrode or may be used in a composition for forming an electrode.

The fuel cell electrolyte membrane described above is placed between a positive electrode and a negative electrode, thereby completely manufacturing a fuel cell.

Each of the positive electrode and negative electrode may include the organic/inorganic complex conductor. Hereinafter, a method of manufacturing a fuel cell electrode including a sulfonated polymer and a polymer of the phosphoric acid-containing monomer will be described in detail.

First, a composition for an electrode catalyst layer is prepared by mixing a catalyst, a binder, a phosphoric acid-containing monomer, a polymerization initiator, and a solvent.

The solvent may be N-methylpyrrolidone (NMP), dimethylacetamide (DMAC), or the like, and the amount of the solvent may be in the range of about 1 to about 10 parts by weight based on 1 part by weight of the catalyst.

The composition for an electrode catalyst layer is coated on the surface of a carbon support to form an electrode. Herein, the carbon support may be fixed on a glass substrate to facilitate the coating. The coating method is not particularly limited, but examples of the coating method may include coating using a doctor blade, bar coating, screen printing, and the like.

After the coating, the mixture is heat treated at a temperature of about 60 to about 120° C. During the heat treatment, the phosphoric acid-containing monomer is polymerized and thus an electrode including the sulfonated polymer and the phosphoric acid-containing polymer is formed.

The catalyst may be platinum (Pt), an alloy or a mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), and chromium (Cr). The platinum (Pt), the alloy, or the mixture may be supported by a carbonaceous support. For example, the catalyst may be at least one metal selected from the group consisting of platinum (Pt), a PtCo alloy, and a PtRu alloy. Such a metal may be supported by a carbonaceous support.

The fuel cell electrode may further include a binder conventionally used in manufacturing processes of an electrode for a fuel cell.

The binder may be at least one of poly(vinylidenefluoride), polytetrafluoroethylene, a tetrafluoroethylene-hexafluoroethylene copolymer, and perfluoroethylene, and the amount of the binder may be in the range of 0.001 to 0.5 parts by weight based on 1 part by weight of the catalyst. When the amount of the binder is within this range, the wettability of the fuel cell electrode may be improved.

The fuel cell may be used as a polymer electrolyte membrane fuel cell (PEMFC), but is not limited thereto.

Examples of the C1-C20 alkyl group include a methyl group, an ethyl group, a propyl group, an isobutyl group, a sec-butyl group, a pentyl group, an iso-amyl group, and a hexyl group. At least one hydrogen atom in the alkyl group may be substituted with a halogen atom, a C1-C20 alkyl group substituted with a halogen atom (e.g., $CCF_3$, $CHCF_2$, $CH_2F$ and $CCl_3$), a hydroxyl group, a nitro group, a cyano group, an amino group, an amidino group, a hydrazine, a hydrazone, a carboxyl group or a salt thereof, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Examples of the $C_2$-$C_{20}$ alkylene group include methylene and ethylene. At least one hydrogen atom in the alkylene group may be substituted with the same substituent as described above in connection with the alkyl group.

Examples of $C1$-$C_{20}$ hydroxyalkyl group may include 2-hydroxyethyl, 3-hydroxypropyl, and 4-hydroxybutyl. At least one hydrogen atom in the hydroxyalkyl group may be substituted with the same substituent as described above in connection with the alkyl group.

An example of $C1$-$C_{20}$ hydroxyalkylamino group is —NH—$CH_2CH_2$—OH. At least one hydrogen atom in the hydroxyalkylamino group may be substituted with the same substituent as described above in connection with the alkyl group.

Use of the organic/inorganic complex proton conductor may prevent catalyst poisoning of a phosphoric acid and leakage of a phosphoric acid during operation, which occur when a polymer electrolyte membrane is manufactured using polybenzimidazole and a phosphoric acid.

In addition, when the organic/inorganic complex proton conductor is used, high proton conductivity and high heat resistance may be obtained without a liquid medium such as water or a phosphoric acid. In addition, use of the organic/inorganic complex proton conductor enables manufacturing of a fuel cell electrode membrane having excellent mechanical characteristics and high proton conductivity. Furthermore, use of a membrane electrode assembly (MEA) manufactured by coating the organic/inorganic complex proton conductor on an electrode or adding the organic/inorganic complex electrolyte membrane to a composition for forming an electrode catalyst layer enables manufacturing of a fuel cell having high cell voltage and high ion conductivity.

The fuel cell electrolyte membrane may have high proton conductivity under non-humidified or low-humidified and high temperature conditions without phosphoric acid. In this regard, the high temperature may be in the range of about 100 to about 170° C.

One or more embodiments of the present invention will be described in further detail with reference to the following examples. These examples are for illustrative purposes only and are not intended to limit the scope of the one or more embodiments of the present invention.

Preparation Example 1

Synthesis of $Sn_{0.7}Li_{0.3}P_2O_7$

SnO2, LiOH.H2O, 85 weight % H3PO4 were mixed such that a mole ratio of Sn, Li, and P was 0.7:0.3:2 to 3 and then an ion exchange water was added thereto and stirred at a temperature of about 250° C., thereby producing mixed paste having a high viscosity. In the mixed paste, the amount of LiOH.H2O was 30 mol % and the amount of SnO2 was 70 mol %. The obtained paste was heat treated in an alumina crucible at a temperature of 650° C. for 2.5 hours.

The obtained clump was milled using a mortar to obtain opalescents powder that was Sn0.7Li0.3P2O7.

The composition of Sn0.7Li0.3P2O7 was identified by induced coupled plasma atomic emission spectroscopy (ICP-AES). The amount (x) of the phosphoric acid was controlled in consideration of loss of the phosphoric acid during the heat treatment so that the composition of Sn0.7Li0.3P2O7 (Sn:Li:P=0.7:0.3:2) (hereinafter referred to as "LiSPO") was obtained.

Preparation Example 2

Preparation of Sulfonated Hydrocarbon Polymer 50 g of polyetherether ketone (PEEK) was reacted with 950 g of a mixture including a sulphuric acid and a fuming sulphuric acid (30% free SO3) in a volume ratio of 57:43 by mixing at room temperature for 42 hours.

Then, the reaction mixture was dropped to excess deionized iced water that was strongly stirred, thereby forming precipitates.

The precipitates were filtered and the filtered precipitates were filtered using deionized water to remove excess sulphuric acid, and then dried at a temperature of 110° C. for 3 days, thereby producing sulfonated polyetherether ketone (SPEEK).

Formula 11

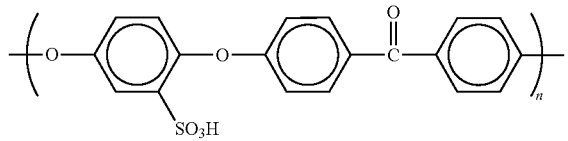

where n is a real number in the range of 100 to 300.
SPEEK

Preparation Example 3

Preparation of Sulfonated Hydrocarbon Polymer
PSF of Formula 9 (PSF is an Acronym of Sulfonated Poly(Arylene Ether Sulfone)) (m=1, n=1, k=400)

S-DCDPS (0.1 mol), DCDPS (0.35 mol), HFIPDP (0.459 mol), and potassium carbonate (0.55 mol) were refluxed using NMP (120 mL) and toluene (100 mL) as a solvent at a temperature of 160° C. for 12 hours, and water generated thereby was removed. Then, the reaction mixture was increased to 180° C. for 2 hours and then polymerization was performed for 4 hours, thereby manufacturing a sulfonated poly (arylene ether sulfone) (PSF).

0.2 g of Phosmer M as a phosmer represented by the formula 4a and 0.01 g of AIBN as a polymerization initiator were dropped into 1 g of 10 weight % SPEEK solution and then the mixture was stirred at room temperature for 2 hours, thereby obtaining a transparent solution.

Reaction Scheme 1

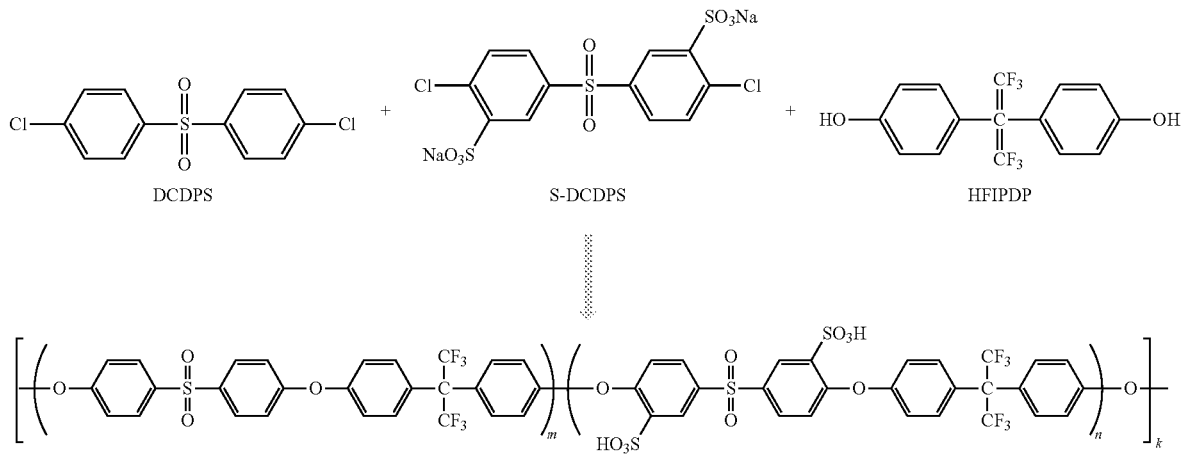

Where m is 1, n is 1, and K is 400.

Example 1

Manufacturing of Organic/Inorganic Complex Electrolyte Membrane (Hydrocarbonpolymer and Inorganic Ion Conductor LiSPO in a Mixed Weight Ratio of 10:90)

Sulfonated hydrocarbon polymer SPEEK prepared according to Preparation Example 2 was dissolved in 18 g of NMP, thereby obtaining 10 weight % SPEEK solution.

Then, 0.2 g of Phosmer M, which is a phosmer represented by formula 4a, and 0.01 g of AIBN as a polymerization initiator were dropped into 1 g of 10 weight % SPEEK solution, and then the mixture was stirred for 2 hours at room temperature, thereby obtaining a transparent solution.

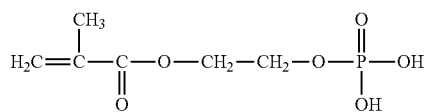

2.7 g of Sn0.7Li0.3P2O7 prepared according to Preparation Example 1 was added to the mixture and then stirred using a ball mill stirrer for 30 minutes. The resultant product was casted and dried at a temperature of about 60° C. to about 130° C. for 7 hours, thereby obtaining a yellowish opaque electrolyte membrane.

Example 2

Manufacturing of Organic/Inorganic Complex Electrolyte Membrane (Hydrocarbonpolymer and LiSPO in a Mixed Weight Ratio of 20:80)

The sulfonated hydrocarbon polymer SPEEK prepared according to Preparation Example 2 was dissolved in 18 g of NMP to obtain 10 weight % SPEEK solution.

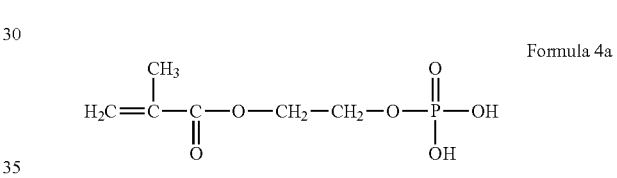

Formula 4a 1.2 g of Sn0.7Li0.3P2O7 prepared according to Preparation Example 1 was added to the mixture and then stirred using a ball mill stirrer for 30 minutes. The resultant product was casted and dried at a temperature of about 60° C. to about 130° C. for 7 hours, thereby obtaining a yellowish opaque electrolyte membrane.

Example 3

Manufacturing of Organic/Inorganic Complex Electrolyte Membrane (Hydrocarbonpolymer and Inorganic Ion Conductor LiSPO in a Mixed Weight Ratio of 50:50)

The sulfonated hydrocarbon polymer (SPEEK) prepared according to Preparation Example 2 was dissolved in 18 g of NMP to obtain 10 weight % SPEEK solution.

0.4 g of Phosmer M, which is a phosmer represented by formula 4a, and 0.01 g of AIBN as a polymerization initiator were dropped into 2 g of 10 weight % SPEEK solution and then the mixture was stirred at room temperature for 2 hours, thereby obtaining a transparent solution.

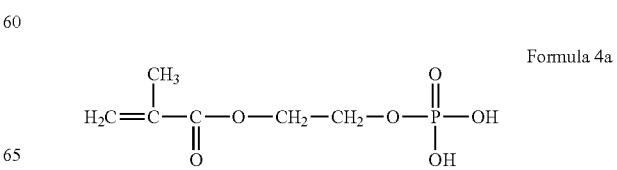

Formula 4a 0.6 g of Sn0.7Li0.3P2O7 prepared according to Preparation Example 1 was added to the mixture and then stirred using a ball mill stirrer for 30 minutes. The resultant product was casted and dried at a temperature of about 60° C. to about 130° C. for 7 hours, thereby obtaining a yellowish opaque electrolyte membrane.

Example 4

Manufacturing of Organic/Inorganic Complex Electrolyte Membrane (Hydrocarbonpolymer and Inorganic Ion Conductor LiSPO in a Mixed Weight Ratio of 80:20)

The sulfonated hydrocarbon polymer (SPEEK) prepared according to Preparation Example 2 was dissolved in 18 g of NMP to obtain 10 weight % SPEEK solution.

0.6 g of Phosmer M, which is a phosmer represented by formula 4a, and 0.01 g of AIBN as a polymerization initiator were dropped into 3 g of 10 weight % SPEEK solution and then the mixture was stirred at room temperature for 2 hours, thereby obtaining a transparent solution.

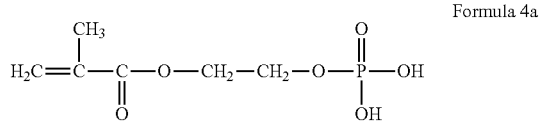

Formula 4a 0.225 g of Sn0.7Li0.3P2O7 prepared according to Preparation Example 1 was added to the mixture and then stirred using a ball mill stirrer for 30 minutes. The resultant product was casted and dried at a temperature of about 60° C. to about 130° C. for 7 hours, thereby obtaining a yellowish opaque electrolyte membrane.

Example 5

Manufacturing of Organic/Inorganic Complex Electrolyte Membrane (Hydrocarbonpolymer and Inorganic Ion Conductor LiSPO in a Mixed Weight Ratio of 90:10)

The sulfonated hydrocarbon polymer (SPEEK) prepared according to Preparation Example 2 was dissolved in 18 g of NMP to obtain 10 weight % SPEEK solution.

1.0 g of Phosmer M, which is a phosmer represented by formula 4a, and 0.01 g of AIBN as a polymerization initiator were dropped into 5 g of 10 weight % SPEEK solution and then the mixture was stirred at room temperature for 2 hours, thereby obtaining a transparent solution.

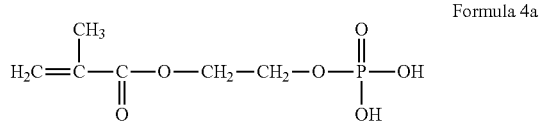

Formula 4a 0.167 g of Sn0.7Li0.3P2O7 prepared according to Preparation Example 1 was added to the mixture and then stirred using a ball mill stirrer for 30 minutes. The resultant product was casted and dried at a temperature of about 60° C. to about 130° C. for 7 hours, thereby obtaining a yellowish opaque electrolyte membrane.

Comparative Example 1

Manufacturing of Electrolyte Membrane

The sulfonated hydrocarbon polymer (SPEEK) prepared according to Preparation Example 2 was dissolved in 18 g of NMP to obtain 10 weight % SPEEK solution.

0.4 g of Sn1P2O7 was added to 1 g of 10 weight % SPEEK solution and then the mixture was stirred using a ball mill stirrer for 30 minutes. The resultant product was casted and dried at a temperature of about 60° C. to about 130° C. for 7 hours, thereby obtaining a yellowish opaque electrolyte membrane.

Proton conductivity of the organic/inorganic complex electrolyte membranes prepared according to Examples 1 through 5 and the electrolyte membrane manufactured according to Comparative Example 1 was evaluated in the following manner.

A voltage bias of 10 mV was applied to the organic/inorganic complex electrolyte membranes prepared according to Examples 1 through 5 and the electrolyte membrane manufactured according to Comparative Example 1 in a frequency range of about 1 Hz to about 1 MHz, and resistance was measured while scanning the temperature.

Figure 2:
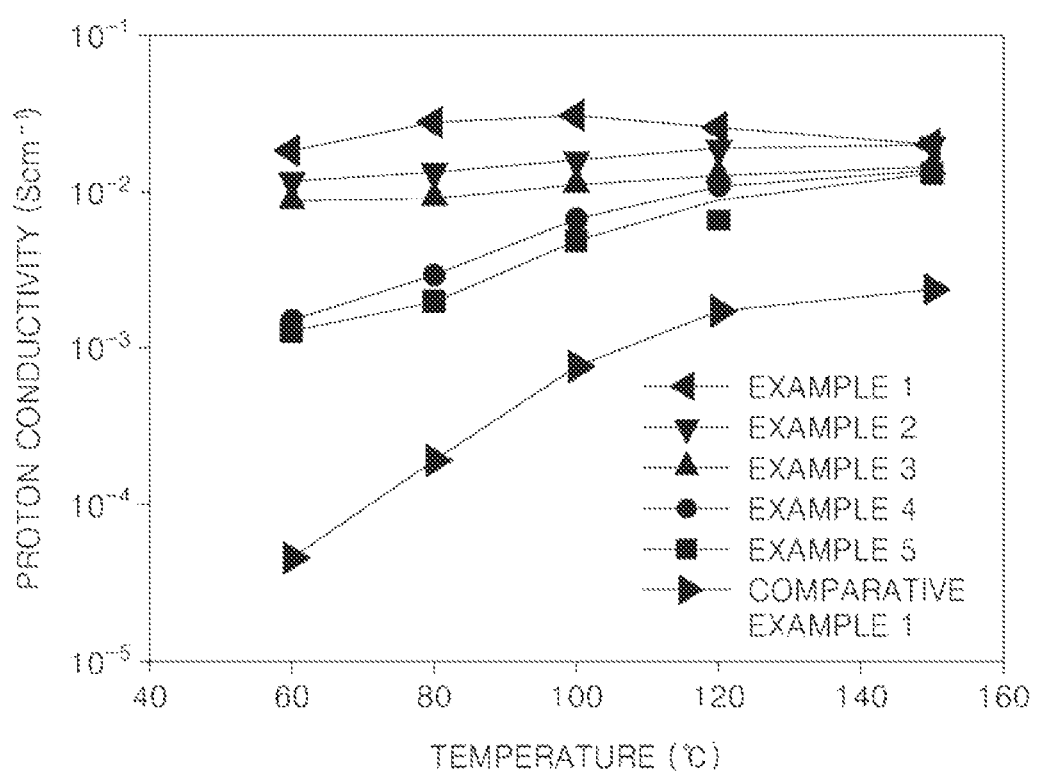
FIG. 2 shows evaluation results of proton conductivity of organic/inorganic complex electrolyte membranes manufactured according to Examples 1 through 5 and an electrolyte membrane manufactured according to Comparative Example 1.

The proton conductivity evaluation results are shown in FIG. 2.

Referring to FIG. 2, proton conductivity of an organic/inorganic complex electrolyte membrane is increased as the amount of the inorganic hydrogen ion conductor is increased in the full temperature range.

Figure 3:
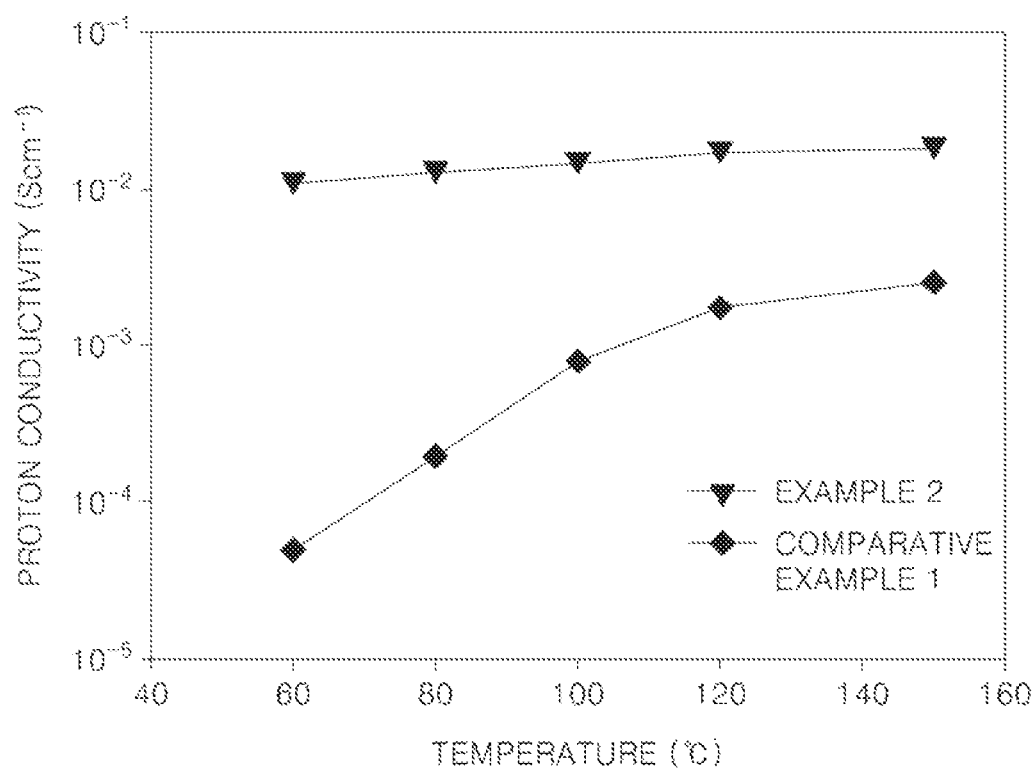
FIG. 3 shows evaluation results of proton conductivity of an organic/inorganic complex electrolyte membrane manufactured according to Example 2 and an electrolyte membrane manufactured according to Comparative Example 1 in the full temperature range.

Proton conductivity with respect to temperature of the organic/inorganic complex electrolyte membrane manufactured according to Example 2 and the electrolyte membrane manufactured according to Comparative Example 1 was evaluated and the results are shown in FIG. 3.

Referring to FIG. 3, the organic/inorganic complex electrolyte membrane manufactured according to Example 2 has higher proton conductivity than the electrolyte membrane manufactured according to Comparative Example 1 in the full temperature range.

Resistance stability with respect to time of the organic/inorganic complex electrolyte membranes manufactured according to Examples 1, 2, and 4 was evaluated. This evaluation was performed by monitoring a change in resistance according to time at a constant temperature.

Figure 4:
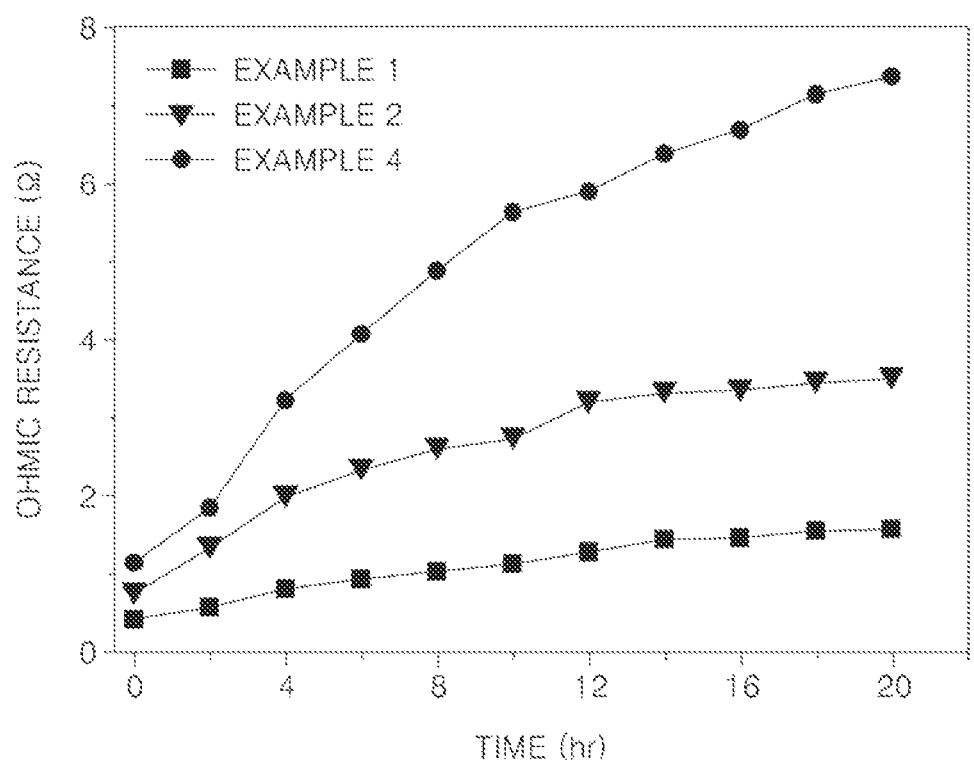
FIG. 4 shows evaluation results of resistance stability with respect to time of organic/inorganic complex electrolyte membranes manufactured according to Examples 1 through 5.

The resistance stability evaluation results are shown in FIG. 4. Referring to FIG. 4, as the amount of the inorganic ion conductor is increased, resistance with respect to time is more constant and thus ion conductivity is more stabilized.

Figure 5:
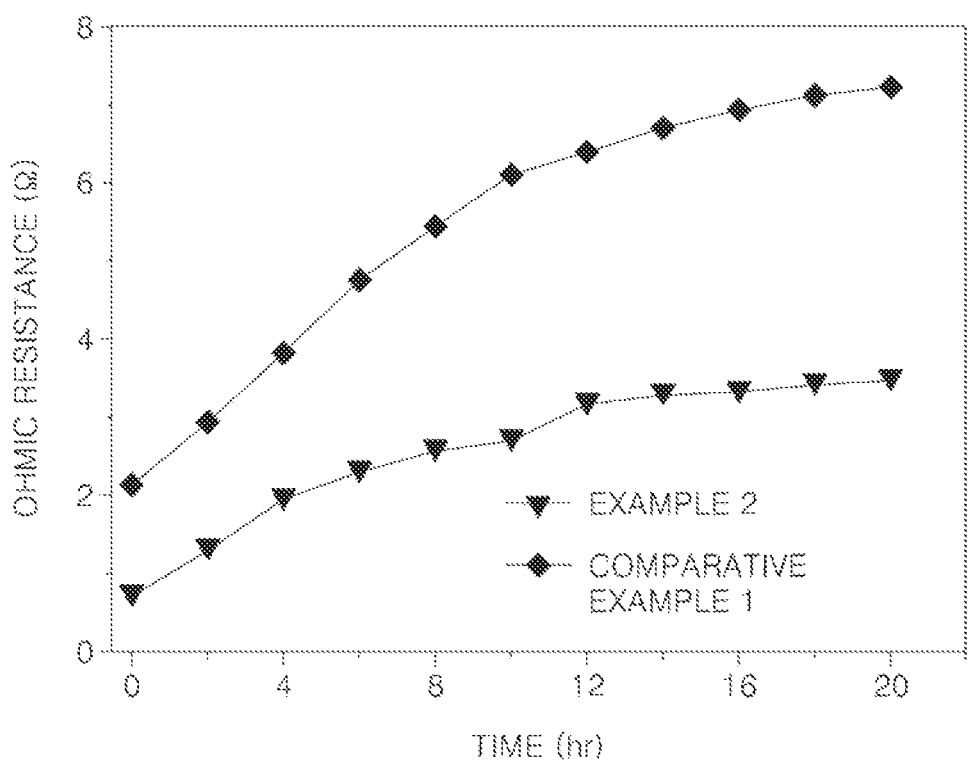
FIG. 5 shows evaluation results of resistance stability of organic/inorganic complex electrolyte membranes manufactured according to Example 2 and Comparative Example 1.

Resistance stability of the organic/inorganic complex electrolyte membrane manufactured according to Example 2 and the electrolyte membrane manufactured according to Comparative Example 1 was evaluated and the results are shown in FIG. 5.

Referring to FIG. 5, the resistance of the organic/inorganic complex electrolyte membrane manufactured according to Example 2 is more stabilized with respect to time than that of the electrolyte membrane manufactured according to Comparative Example 1.

Manufacturing Example 1

Manufacturing of Fuel Cell

Commercially available electrodes using 1 mg of Pt as a catalyst manufactured by Elechem Co., Inc. were used as a positive electrode and a negative electrode.

The organic/inorganic complex electrolyte membrane manufactured according to Example 2 was placed between the positive electrode and the negative electrode to form a fuel cell.

In this experiment, the organic/inorganic complex electrolyte membrane manufactured according to Example 2 was used as an electrolyte membrane.

Characteristics of the fuel cell were evaluated at a temperature of 120° C. while the organic/inorganic complex electrolyte membrane was non-humidified, hydrogen (fluid velocity: 100 ccm) was supplied to the negative electrode, and air was supplied to the positive electrode.

Comparative Manufacturing Example 1

Manufacturing of Fuel Cell

A fuel cell was manufactured in the same manner as in Manufacturing Example 1, except that the electrolyte membrane manufactured according to Comparative Example 1 was used instead of the organic/inorganic complex electrolyte membrane manufactured according to Example 2, and characteristics of the fuel cell were evaluated.

Figure 6:
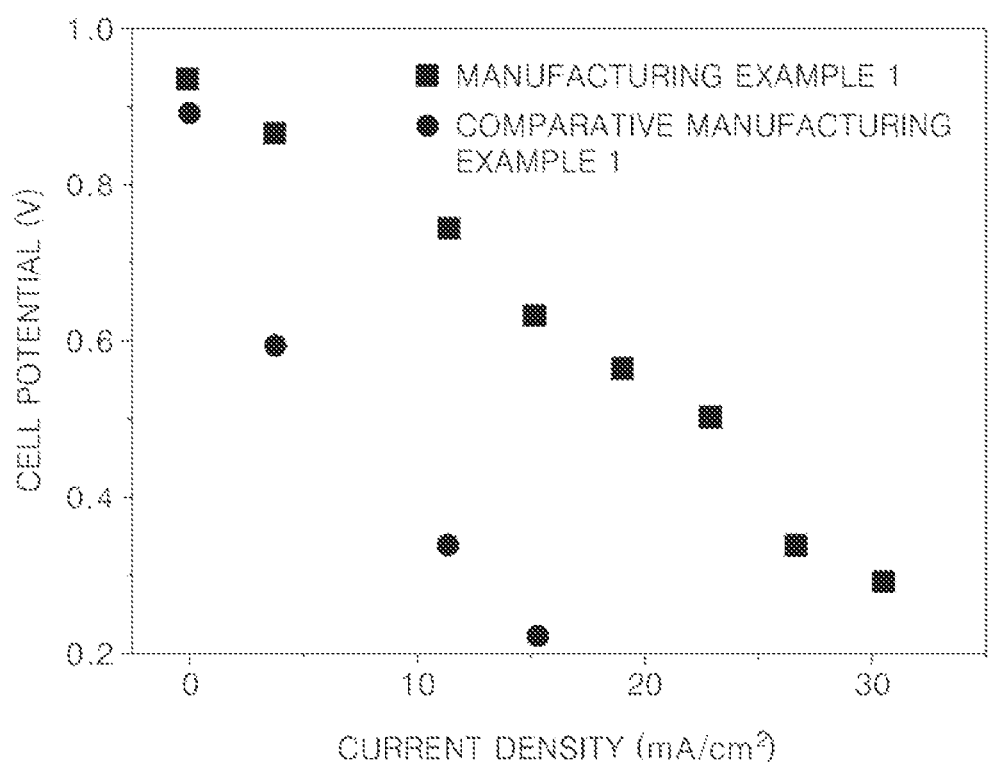
FIG. 6 is a graph of a cell potential with respect to current density of fuel cells manufactured according to Manufacturing Example 1 and Comparative Manufacturing Example 1.

A cell potential with respect to a current density of the fuel cells manufactured according to Manufacturing Example 1 and Comparative Manufacturing Example 1 was evaluated and the results are shown in FIG. 6.

Referring to FIG. 6, the fuel cell of Manufacturing Example 1 has a higher cell potential than the fuel cell of Comparative Manufacturing Example 1.

As described above, the organic/inorganic complex electrolyte membranes according to the one or more of the above embodiments of the present invention have high proton conductivity over a wide temperature range. Use of the organic/inorganic complex proton conductor enables manufacturing of a fuel cell electrolyte membrane having high mechanical strength and high proton conductivity and an electrode having high mechanical strength and high proton conductivity.

It should be understood that the exemplary embodiments described herein should be considered in a descriptive sense only and not for purposes of limitation. It is understood by those skilled in the art that changes may be made in these embodiments without departing from the principles and spirit of the invention, the scope of which is defined in the claims and their equivalents.

What is claimed is:

1. An organic/inorganic complex proton conductor comprising an inorganic ion conductor represented by Formula 1 below and a hydrocarbon polymer:

$$M_{1-a}N_aP_2O_7 \quad \text{Formula 1}$$

where
M is a metallic element having an oxidation number of +4,
N is an alkali metal or alkali earth metal, and
a is a real number in the range of 0.01 to 0.7,
wherein the hydrocarbon polymer comprises a sulfonated polymer and the sulfonated polymer comprises at least one selected from the group consisting of perfluorinated sulfonic acid-containing polymer, sulfonated polyarylenesulfone, sulfonated polyether ether ketone, and sulfonated polyetherimide, and the inorganic ion conductor has a main phase crystal structure.

2. The organic/inorganic complex proton conductor of claim 1, wherein the amount of the inorganic ion conductor is in the range of about 5 to about 900 parts by weight based on 100 parts by weight of the hydrocarbon polymer.

3. The organic/inorganic complex proton conductor of claim 1, wherein the amount of the inorganic ion conductor is in the range of about 100 to about 900 parts by weight based on 100 parts by weight of the hydrocarbon polymer.

4. The organic/inorganic complex proton conductor of claim 1, wherein M comprises at least one element selected from the group consisting of tin (Sn), zirconium (Zr), tungsten (W), silicon (Si), molybdenum (Mo), and titanium (Ti).

5. The organic/inorganic complex proton conductor of claim 1, wherein N comprises lithium (Li), sodium (Na), potassium (K), and cesium (Cs).

6. The organic/inorganic complex proton conductor of claim 1, wherein M is tin (Sn).

7. The organic/inorganic complex proton conductor of claim 1, wherein in Formula 1, a is a real number in the range of 0.05 to 0.5.

8. The organic/inorganic complex proton conductor of claim 1, wherein the inorganic ion conductor of Formula 1 is $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, or $W_{0.9}Li_{0.1}P_2O_7$.

9. The organic/inorganic complex proton conductor of claim 1, wherein the hydrocarbon polymer further comprises an acidic group-containing hydrophilic polymer.

10. The organic/inorganic complex proton conductor of claim 9, wherein the acidic group-containing hydrophilic polymer is a phosphoric acid-containing polymer.

11. The organic/inorganic complex proton conductor of claim 10, wherein the phosphoric acid-containing polymer is a polymer of a compound represented by Formula 2 or a compound represented by Formula 3:

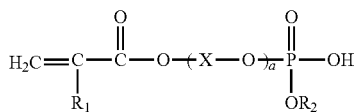

Formula 2 wherein, in formula 2, X is an unsubstituted or substituted C1-C20 alkylene group,
a is an integer in the range of 1 to 10,
$R_1$ is hydrogen or a C1-C20 alkyl group, and R₂ is selected from the group consisting of hydrogen, unsubstituted or substituted a C1-C20 alkyl group, unsubstituted or substituted C1-C20 hydroxyalkyl group, and an unsubstituted or substituted C1-C20 hydroxyalkylamino group; and Formula 3

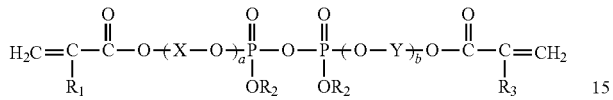

wherein, in formula 3, X and Y are each independently an unsubstituted or substituted C1-C20 alkylene group, a and b are each independently in the range of 1 to 10, $R_1$ and $R_3$ are each independently hydrogen or a C1-C20 alkyl group, and $R_2$ is selected from the group consisting of hydrogen, an unsubstituted or substituted a C1-C20 alkyl group, an unsubstituted or substituted C1-C20 hydroxyalkyl group, and an unsubstituted or substituted C1-C20 hydroxyalkylamino group.

12. The organic/inorganic complex proton conductor of claim 11, wherein the compound represented by Formula 2 comprises at least one compound selected from the group consisting of compounds represented by Formulae 4 through 6 below:

Formula 4

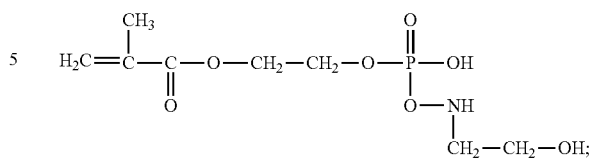

wherein, in formula 4, n is an integer in the range of 2 to 10;

Formula 5

$$H_2C=\underset{CH_3}{\overset{}{C}}-\underset{\overset{\parallel}{O}}{C}-O-CH_2-CH_2-O-\underset{\underset{CH_2-CH_2-OH}{\overset{\mid}{NH}}}{\overset{\overset{O}{\parallel}}{P}}-OH$$

Formula 6

$$H_2C=\underset{CH_3}{\overset{}{C}}-\underset{\overset{\parallel}{O}}{C}-O\text{\textemdash}(CH_2-\underset{CH_3}{\overset{}{CH}}-O)_{\overline{n}}\overset{\overset{O}{\parallel}}{\underset{OH}{P}}-OH$$

wherein, in formula 6, n is an integer in the range of 2 to 10.

13. The organic/inorganic complex proton conductor of claim 11, wherein the compound represented by Formula 3 is a compound represented by Formula 7 below:

Formula 7

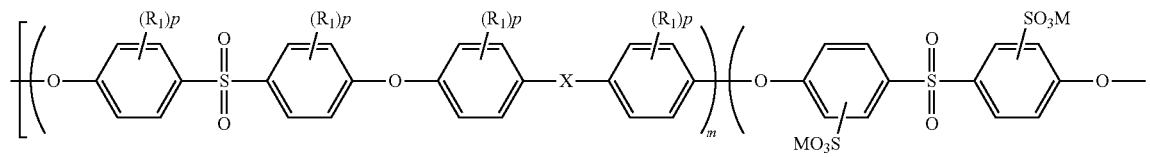

wherein $R_{10}$ and $R_{13}$ are each independently hydrogen or a C1-C20 alkyl group, $R_{11}$ and $R_{12}$ are each independently hydrogen or a C1-C20 alkyl group, and each of t and w is an integer in the range of 1 to 10.

14. The organic/inorganic complex proton conductor of claim 1, wherein the sulfonated polymer is a compound represented by Formula 8 below:

Formula 8 wherein, in formula 8, $R_1$ is identical to or different from each other, and is a C1-C10 alkyl group, a C2-C10 alkenyl group, a phenyl group, or a nitro group, p is an integer in the range of 0 to 4, X is —C(CF$_3$)$_2$—, —C(CH$_3$)$_2$—, or —PY'(=O)— wherein Y' is H or C$_6$H$_5$, M is Na, K, or H, m is a real number in the range of 0.1 to 10, n is a real number in the range of 0.1 to 10, and k is a real number in the range of 5 to 500.

15. The organic/inorganic complex proton conductor of claim 1, wherein the sulfonated polymer is a compound represented by Formula 9, a compound represented by Formula 10, or a compound represented by Formula 11:

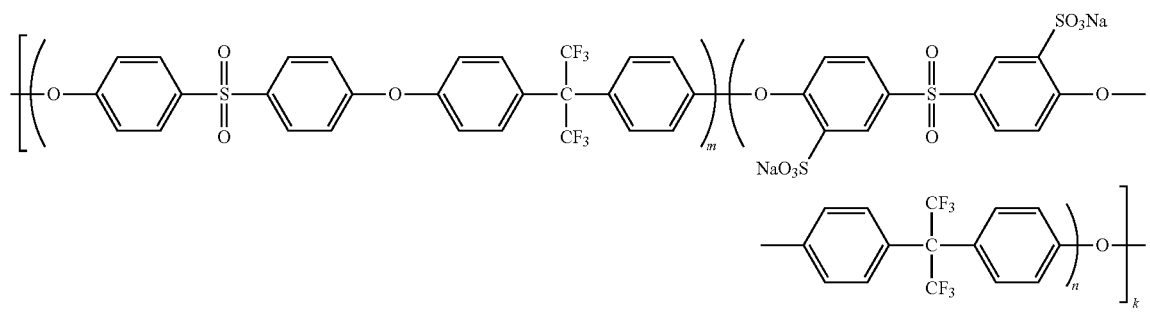

Formula 9 wherein, in formula 9, m is a real number in the range of 0.1 to 4, and n is a real number in the range of 0.1 to 4, and k is a real number in the range of 5 to 500;

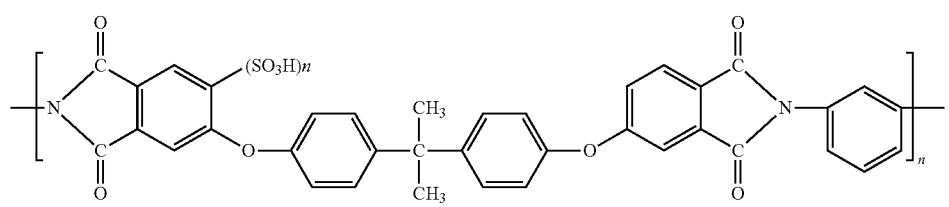

Formula 10 wherein, in formula 10, n is a real number in the range of 2 to 500; and

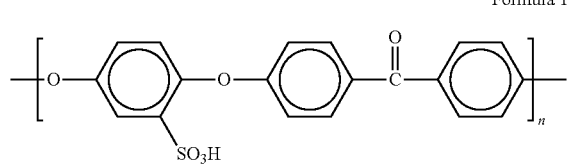

Formula 11 wherein, in formula 11, n is a real number in the range of 3 to 500.

16. The organic/inorganic complex proton conductor of claim 9, wherein a mixed mole ratio of the sulfonated polymer and the acidic group-containing hydrophilic polymer is in the range of 1:1 to 1:10.

17. An electrolyte membrane for a fuel cell comprising an organic/inorganic complex proton conductor comprising an inorganic ion conductor represented by Formula 1 below and a hydrocarbon polymer:

$$M_{1-a}N_aP_2O_7 \qquad \text{Formula 1}$$

where M is a metallic element having an oxidation number of +4,

N is an alkali metal or alkali earth metal, and a is a real number in the range of 0.01 to 0.7, wherein the hydrocarben polymer comprises a sulfonated polymer and the sulfonated polymer comprises at least one selected from the group consisting of perfluorinated sulfonic acid-containing polymer, sulfonated polyarylenesulfone, sulfonated polyether ether ketone, and sulfonated polyetherimide, and the inorganic ion conductor has a main phase crystal structure.

18. An electrode for a fuel cell comprising an organic/inorganic complex proton conductor comprising an inorganic ion conductor represented by Formula 1 below and a hydrocarbon polymer:

$$M_{1-a}N_aP_2O_7 \qquad \text{Formula 1}$$

where

M is a metallic element having an oxidation number of +4,

N is an alkali metal or alkali earth metal, and a is a real number in the range of 0.01 to 0.7, wherein the hydrocarbon polymer comprises a sulfonated polymer containing hydrophillic polymer that is a polymer of a compound and the sulfonated polymer comprises at least on selected from the group consisting of perfluorinated sulfonic acid-containing polymer, sulfonated polyarylenesulfone, sulfonated polyether ether ketone, and sulfonated polyetherimide, and the inorganic ion conductor has a main phase crystal structure.

19. A fuel cell comprising a positive electrode, a negative electrode, and an electrolyte membrane interposed between the positive electrode and the negative electrode,
wherein at least one of the positive electrode, the negative electrode, and the electrolyte membrane comprises the organic/inorganic complex proton conductor comprising an inorganic ion conductor represented by Formula 1 below and a hydrocarbon polymer:

$$M_{1-a}N_aP_2O_7 \qquad \text{Formula 1}$$

where
M is a metallic element having an oxidation number of +4,
N is an alkali metal or alkali earth metal, and
a is a real number in the range of 0.01 to 0.7, and the inorganic ion conductor has a main phase crystal structure.

20. The electrolyte membrane of claim 17, wherein the amount of the inorganic ion conductor is in the range of about 5 to about 900 parts by weight based on 100 parts by weight of the hydrocarbon polymer.

21. The electrolyte membrane of claim 17, wherein M comprises at least one element selected from the group consisting of tin (Sn), zirconium (Zr), tungsten (W), silicon (Si), molybdenum (Mo), and titanium (Ti), and N comprises lithium (Li), sodium (Na), potassium (K), or cesium (Cs).

22. The electrolyte membrane of claim 17, wherein the inorganic ion conductor of Formula 1 is $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, or $W_{0.9}Li_{0.1}P_2O_7$.

23. The electrolyte membrane of claim 17, wherein the sulfonated polymer is a compound represented by Formula 8, a compound represented by Formula 9, a compound represented by Formula 10, or a compound represented by Formula 11:

Formula 8

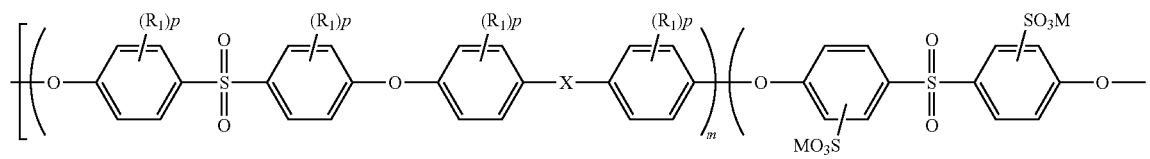

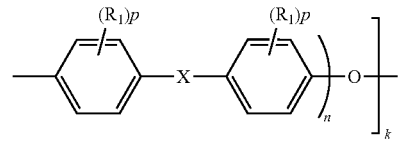

wherein, in formula 8, $R_1$ is identical to or different from each other, and is a C1-C10 alkyl group, a C2-C10 alkenyl group, a phenyl group, or a nitro group,
p is an integer in the range of 0 to 4,
X is —C(CF$_3$)$_2$—, —C(CH$_3$)$_2$—, or —PY'(=O)— wherein Y' is H or C$_6$H$_5$,
M is Na, K, or H,
m is a real number in the range of 0.1 to 10, n is a real number in the range of 0.1 to 10, and k is a real number in the range of 5 to 500;

Formula 9

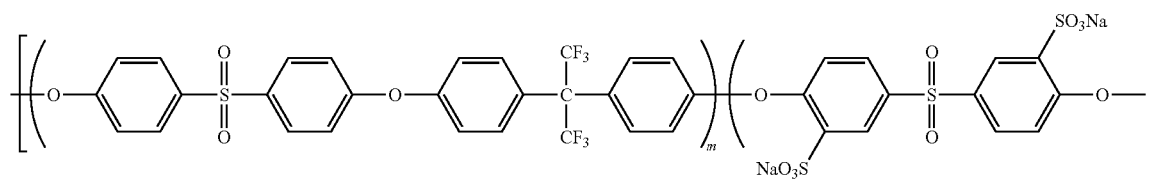

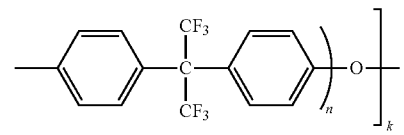

wherein, in formula 9, m is a real number in the range of 0.1 to 4, and n is a real number in the range of 0.1 to 4, and k is a real number in the range of 5 to 500;

Formula 10

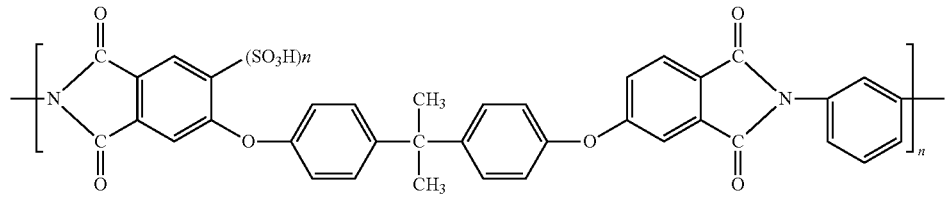

wherein, in formula 10, n is a real number in the range of 2 to 500; and

Formula 11

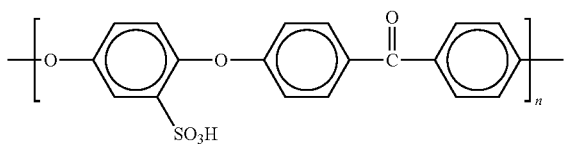

wherein, in formula 11, n is a real number in the range of 3 to 500.

24. The electrode of claim 18, wherein the amount of the inorganic ion conductor is in the range of about 5 to about 900 parts by weight based on 100 parts by weight of the hydrocarbon polymer.

25. The electrode of claim 18, wherein M comprises at least one element selected from the group consisting of tin (Sn), zirconium (Zr), tungsten (W), silicon (Si), molybdenum (Mo), and titanium (Ti), and N comprises lithium (Li), sodium (Na), potassium (K), or cesium (Cs).

26. The electrode of claim 18, wherein the inorganic ion conductor of Formula 1 is $Sn_{0.7}Li_{0.3}P_2O_7$, $Sn_{0.95}Li_{0.05}P_2O_7$, $Sn_{0.9}Li_{0.1}P_2O_7$, $Sn_{0.8}Li_{0.2}P_2O_7$, $Sn_{0.6}Li_{0.4}P_2O_7$, $Sn_{0.5}Li_{0.5}P_2O_7$, $Sn_{0.7}Na_{0.3}P_2O_7$, $Sn_{0.7}K_{0.3}P_2O_7$, $Sn_{0.7}Cs_{0.3}P_2O_7$, $Zr_{0.9}Li_{0.1}P_2O_7$, $Ti_{0.9}Li_{0.1}P_2O_7$, $Si_{0.9}Li_{0.1}P_2O_7$, $Mo_{0.9}Li_{0.1}P_2O_7$, or $W_{0.9}Li_{0.1}P_2O_7$.

27. The electrode of claim 18, wherein the sulfonated polymer is a compound represented by Formula 8, a compound represented by Formula 9, a compound represented by Formula 10, or a compound represented by Formula 11:

Formula 8

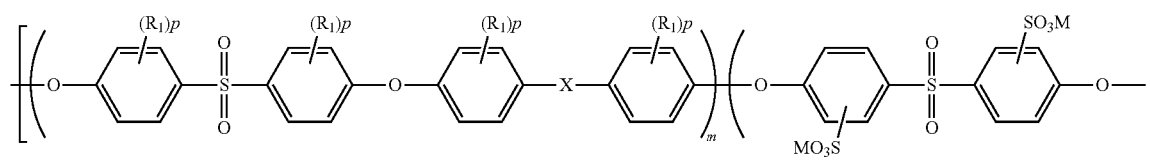

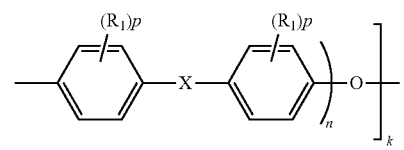

wherein, in formula 8, $R_1$ is identical to or different from each other, and is a C1-C10 alkyl group, a C2-C10 alkenyl group, a phenyl group, or a nitro group, p is an integer in the range of 0 to 4, X is —C(CF$_3$)$_2$—, —C(CH$_3$)$_2$—, or —PY'(=O)— wherein Y' is H or $C_6H_5$, M is Na, K, or H, m is a real number in the range of 0.1 to 10, n is a real number in the range of 0.1 to 10, and k is a real number in the range of 5 to 500;

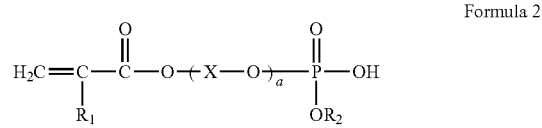

Formula 9

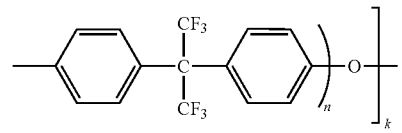

wherein, in formula 9, m is a real number in the range of 0.1 to 4, and n is a real number in the range of 0.1 to 4, and k is a real number in the range of 5 to 500;

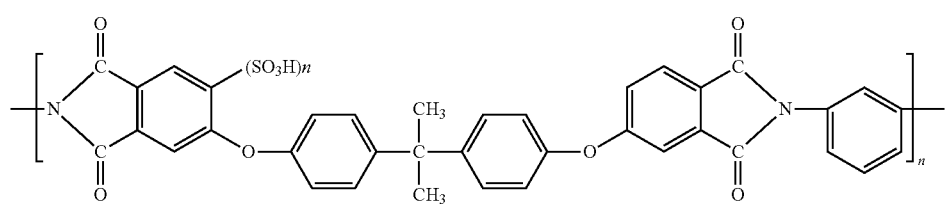

wherein, in formula 10, n is a real number in the range of 2 to 500; and

Formula 11

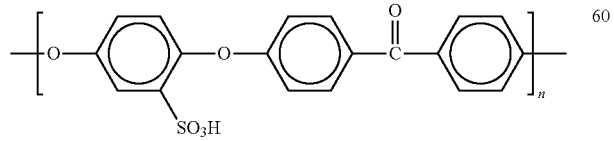

wherein, in formula 11, n is a real number in the range of 3 to 500.

28. The electrolyte membrane of claim 17, wherein the hydrocarbon polymer further comprises an acidic group-containing hydrophilic polymer, and the acidic group-containing hydrophilic polymer is a polymer of a compound represented by Formula 2 or a compound represented by Formula 3:

Formula 2

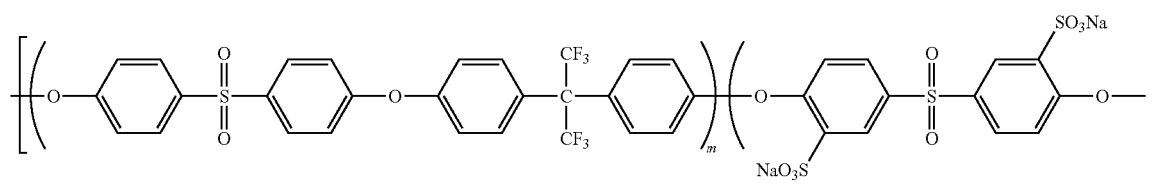

wherein, in formula 2, X is an unsubstituted or substituted C1-C20 alkylene group, a is an integer in the range of 1 to 10, Formula 10

$R_1$ is hydrogen or a C1-C20 alkyl group, and $R_2$ is selected from the group consisting of hydrogen, unsubstituted or substituted a C1-C20 alkyl group, unsubstituted or substituted C1-C20 hydroxyalkyl group, and an unsubstituted or substituted C1-C20 hydroxyalkylamino group; and

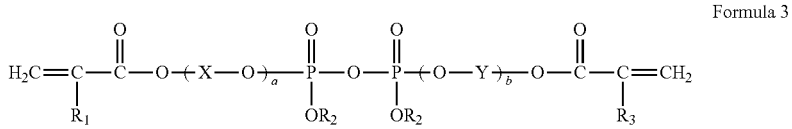

Formula 3 wherein, in formula 3, X and Y are each independently an unsubstituted or substituted C1-C20 alkylene group,
a and b are each independently in the range of 1 to 10,
$R_1$ and $R_3$ are each independently hydrogen or a C1-C20 alkyl group, and
$R_2$ is selected from the group consisting of hydrogen, an unsubstituted or substituted a C1-C20 alkyl group, an unsubstituted or substituted C1-C20 hydroxyalkyl group, and an unsubstituted or substituted C1-C20 hydroxyalkylamino group.

29. The electrolyte membrane of claim 28, wherein the compound represented by Formula 2 comprises at least one compound selected from the group consisting of compounds represented by Formulae 4 through 6 below, and the compound represented by Formula 3 is a compound represented by Formula 7 below:

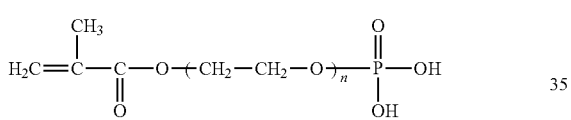

Formula 4 wherein, in formula 4, n is an integer in the range of 2 to 10;

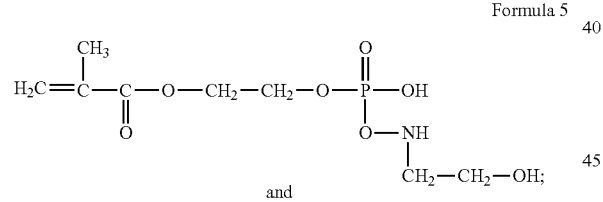

Formula 5 and

Formula 6

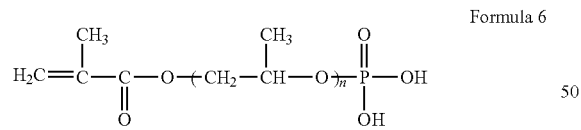

wherein, in formula 6, n is an integer in the range of 2 to 10;

wherein $R_{10}$ and $R_{13}$ are each independently hydrogen or a C1-C20 alkyl group, $R_{11}$ and $R_{12}$ are each independently hydrogen or a C1-C20 alkyl group, and each of t and w is an integer in the range of 1 to 10.

30. The electrode of claim 18, wherein the hydrocarbon polymer further comprises an acidic group-containing hydrophilic polymer, and the acidic group-containing hydrophilic polymer is a polymer of a compound represented by Formula 2 or a compound represented by Formula 3:

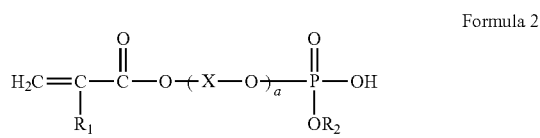

Formula 2 wherein, in formula 2, X is an unsubstituted or substituted C1-C20 alkylene group,
a is an integer in the range of 1 to 10,
$R_1$ is hydrogen or a C1-C20 alkyl group, and
$R_2$ is selected from the group consisting of hydrogen, unsubstituted or substituted a C1-C20 alkyl group, unsubstituted or substituted C1-C20 hydroxyalkyl group, and an unsubstituted or substituted C1-C20 hydroxyalkylamino group; and

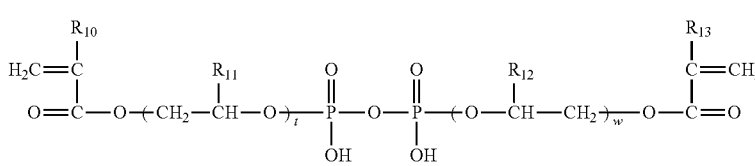

Formula 7

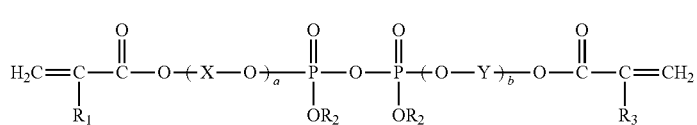

Formula 3 wherein, in formula 3, X and Y are each independently an unsubstituted or substituted C1-C20 alkylene group,
a and b are each independently in the range of 1 to 10,
$R_1$ and $R_3$ are each independently hydrogen or a C1-C20 alkyl group, and
$R_2$ is selected from the group consisting of hydrogen, an unsubstituted or substituted a C1-C20 alkyl group, an unsubstituted or substituted C1-C20 hydroxyalkyl group, and an unsubstituted or substituted C1-C20 hydroxyalkylamino group.

31. The electrode of claim 30, wherein the compound represented by Formula 2 comprises at least one compound selected from the group consisting of compounds represented by Formulae 4 through 6 below, and the compound represented by Formula 3 is a compound represented by Formula 7 below:

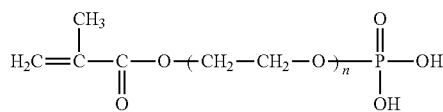

Formula 4 wherein, in formula 4, n is an integer in the range of 2 to 10;

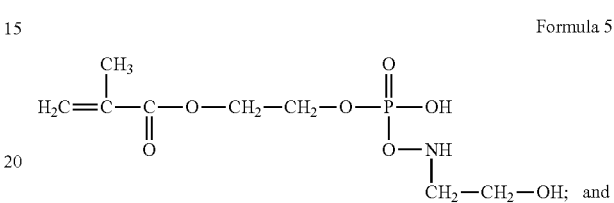

Formula 5

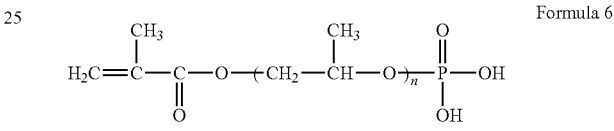

Formula 6 wherein, in formula 6, n is an integer in the range of 2 to 10;

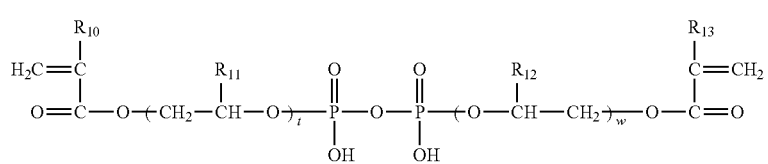

Formula 7 wherein $R_{10}$ and $R_{13}$ are each independently hydrogen or a C1-C20 alkyl group, $R_{11}$ and $R_{12}$ are each independently hydrogen or a C1-C20 alkyl group, and each of t and w is an integer in the range of 1 to 10.

* * * * *